(12) United States Patent
Na et al.

(10) Patent No.: US 7,170,742 B2
(45) Date of Patent: Jan. 30, 2007

(54) PERIPHERAL DEVICE MOUNTING HOLDER AND PORTABLE COMPUTER INCLUDING THE HOLDER

(75) Inventors: Sang-Ju Na, Seoul (KR); Jun-Hyung Lee, Osan (KR)

(73) Assignee: LG Electronics Inc., Seoul (KR)

(*) Notice: Subject to any disclaimer, the term of this patent is extended or adjusted under 35 U.S.C. 154(b) by 226 days.

(21) Appl. No.: 10/251,991

(22) Filed: Sep. 23, 2002

(65) Prior Publication Data

US 2003/0058614 A1  Mar. 27, 2003

(30) Foreign Application Priority Data

Sep. 26, 2001 (KR) ............... 2001-59723
Oct. 10, 2001 (KR) ............... 2001-62470

(51) Int. Cl.
*H05K 7/00* (2006.01)
(52) U.S. Cl. .................................. 361/684
(58) Field of Classification Search ........ 361/683–686, 361/727; 439/59, 62, 79, 80, 64; 312/223.1, 312/223.2
See application file for complete search history.

(56) References Cited

U.S. PATENT DOCUMENTS

| 4,050,769 | A | * | 9/1977 | Ammon ..................... 439/701 |
| 4,412,712 | A | * | 11/1983 | Reimer et al. .............. 439/64 |
| 5,400,216 | A | * | 3/1995 | Tsai ........................... 361/684 |
| 5,559,672 | A | * | 9/1996 | Buras et al. ................ 361/684 |
| 5,574,625 | A | * | 11/1996 | Ohgami et al. ............ 361/684 |
| 5,816,826 | A | * | 10/1998 | Colemen ..................... 439/64 |
| 5,951,310 | A | | 9/1999 | Seto et al. .................. 439/142 |
| 6,179,622 | B1 | * | 1/2001 | Lai et al. ..................... 439/64 |
| 2002/0137370 | A1 | * | 9/2002 | Harting et al. ............. 439/83 |

FOREIGN PATENT DOCUMENTS

| CN | 2309581 Y | 3/1999 |
| CN | 2364497 Y | 2/2000 |
| JP | 04-328618 | 11/1992 |
| JP | 08-161862 | 6/1996 |
| JP | 09-266028 | 10/1997 |
| JP | 10-097348 | 4/1998 |
| JP | 10-506731 | 6/1998 |
| JP | 2001-025079 | 1/2001 |

* cited by examiner

*Primary Examiner*—Lisa Lea-Edmonds
*Assistant Examiner*—Corey Broussard
(74) *Attorney, Agent, or Firm*—Fleshner & Kim, LLP (57) ABSTRACT

In a peripheral device mounting holder, a portable computer including the holder and methods for using the same, by fixing a holder mounting a storing device and a connector contacted to the storing device to a main board as one body, the holder and the connector can be aligned. In addition, by aligning an extended card with the holder, an assembly process can be facilitated, and a space usability of the main board can be improved. The holder can have a first side for engageably aligning the peripheral device and a second side opposite the first side for aligning an extended device.

22 Claims, 7 Drawing Sheets

PERIPHERAL DEVICE MOUNTING HOLDER AND PORTABLE COMPUTER INCLUDING THE HOLDER

BACKGROUND OF THE INVENTION

1. Field of the Invention

The present invention relates to a portable computer and in particular to a peripheral device mounting holder of a portable computer.

2. Background of the Related Art

With the development and progress of computers and Internet technologies, computer equipment and communication equipment, computer users have increased. Computers can be divided into desktop computers for use in one location such as an office and portable computers. Since portable computers have small volume and light weight, they are movable and easy to carry, and because portable computers have internal batteries, they can be used in areas not having external power source. Due to technology improvements, the portable computer can have a larger capacity and perform wireless communications as well as wire communications, and accordingly portable computer users have also increased.

Figure 1:
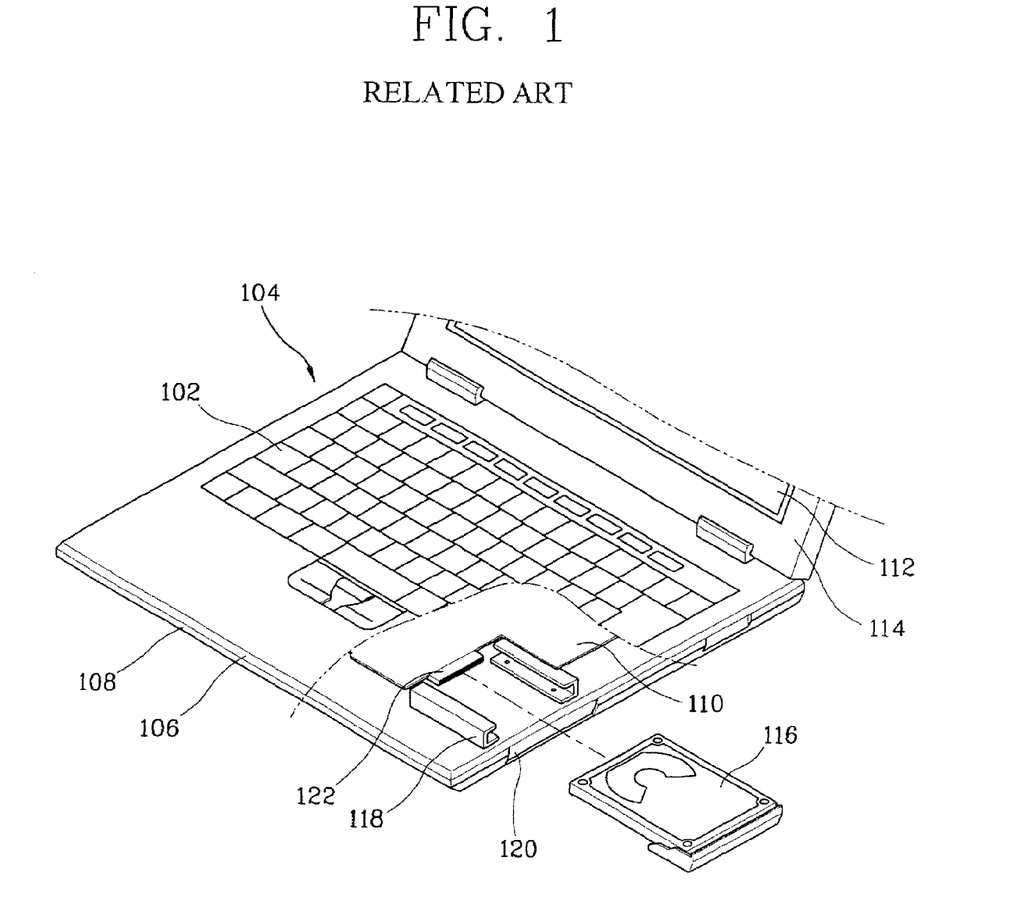
FIG. 1 is a diagram that shows an exploded partial cut-away perspective view of a related art storing device installation structure of a portable computer.

FIG. 1 is a diagram that shows an exploded partial cut-away perspective view of a related art storing device installation structure of a portable computer. As shown in FIG. 1, in the related art portable computer, a key board 102 for inputting various information is installed on a deck casing 106 of a main body 104, a main board 110 for mounting various electronic circuit parts is installed on a lower casing 108 of the main body 104, and an LCD 112 for displaying various information is installed in a cover 114 that is hinge-coupled to the main body 104 so as rotate or move between an open position and a closed position.

A holder 118 for detachably receiving a hard disk drive 116 is connected to the bottom surface of the lower casing 108, and a bay 120, into which the hard disk drive 116 is inserted, is formed at a side surface of the main body 104. A connector 122 for electrical connection to the inserted hard disk drive 116 is fixed to a top surface of the main board 110.

As described above, however, the related art portable computer has various disadvantages. Since the holder 118 for detachably receiving the hard disk drive 116 is connected to the lower casing 108 and the connector 122 is installed on or connected to the top of the main board 110, when an installation point of the main board 110 or the holder 118 is not accurate in assembling the portable computer, misalignments occur. In this case, for example, the position of the holder 118 and the connector 122 do not coincide with each other, and accordingly it is difficult to insert the hard disk drive 116 and to accurately contact the hard disk drive 116 to the connector 122. Further, when such a misaligned hard disk drive 116 and connector 122 are forcibly contacted, the hard disk drive 116 and/or the connector 122 may be damaged. In addition, a thickness of the related art portable computer is increased.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

Another object of the present invention is to provide a peripheral device mounting holder for a portable computer that aligns the holder to a connector on a main circuit board.

Another object of the present invention is to provide a peripheral device mounting holder for a portable computer that aligns a holder and a connector by fixing the holder and the connector to a main board as one body.

Another object of the present invention is to provide a peripheral device mounting holder for a portable computer that aligns a holder and a connector by fixing the holder and the connector to a main board as one body on opposite sides of the main board.

Another object of the present invention is to provide a portable computer that facilitates an assembly process and increases a space usability of a main board by combining a peripheral device mounting holder with an extended card.

Another object of the present invention is to provide a peripheral device mounting holder for a portable computer that has a first side holding a storage device and a second side for holding an extended card.

Another object of the present invention to provide a portable computer that facilitates an assembling process and increases space usability of a main board by fixing an extended card by using a separate fixed board without using the main board.

In order to achieve at least the above objects in a whole or in part, a portable computer in accordance with the present invention is provided that includes a main circuit board for connection to a plurality of components, the main circuit board including a first connector for connection to a storage device and a second connector for connection to an extended card, and a holder fixedly attached to the main circuit board, wherein the holder aligns an engaging portion of the first storage device to the first connector and an engaging portion of the extended card to the second connector.

To further achieve the above objects in a whole or in part, a portable computer in accordance with the present invention is provided that includes a main board that mounts various circuit parts of the portable computer and a holder having a first side for receiving a peripheral device, wherein a fixed portion for fixing an extended card is formed at a second side of the holder, wherein the second side is opposite the first side.

To further achieve the above objects in a whole or in part, a portable computer in accordance with the present invention includes a main board placed inside a main body, a connector installed to the main board for electrical connection to an extended card, and a fixed holding portion installed on the main board for aligning and fixing the extended card so as to be contacted to the connector.

To further achieve the above objects in a whole or in part, a portable computer in accordance with the present invention includes a main body, a display unit that outputs various information, wherein the display unit is rotatably coupled to the main body to move between an open and closed position, a main board in the main body that mounts various circuit parts for processing information and applying electric signals to the display unit, an input unit that inputs control signals to the main board according to a user's order, a holder mounted to the main board, wherein the holder includes a first holding surface on one side of the holder, and a second holding surface on an opposite side of the holder, a first peripheral device including a storing device held on said first holding surface, and a second peripheral device including an extended card held on said second holding surface.

To further achieve the above objects in a whole or in part, an electronic apparatus in accordance with the present invention includes an apparatus body having a wall portion in which a card insertion hole is formed, a main circuit board for connection to a plurality of components, the main circuit board including a first connector mounted on a first side of the main circuit board, and a holder mounted on a second side of the main circuit board having an opening portion opposed to the card insertion hole of the apparatus body, and defining a card storage portion for storing a card-like electronic component to be inserted from the card insertion hole, wherein the first connector is for connection to the card-like electronic component loaded into the card storage portion, and wherein the second side is opposite the first side of the main circuit board.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 2:
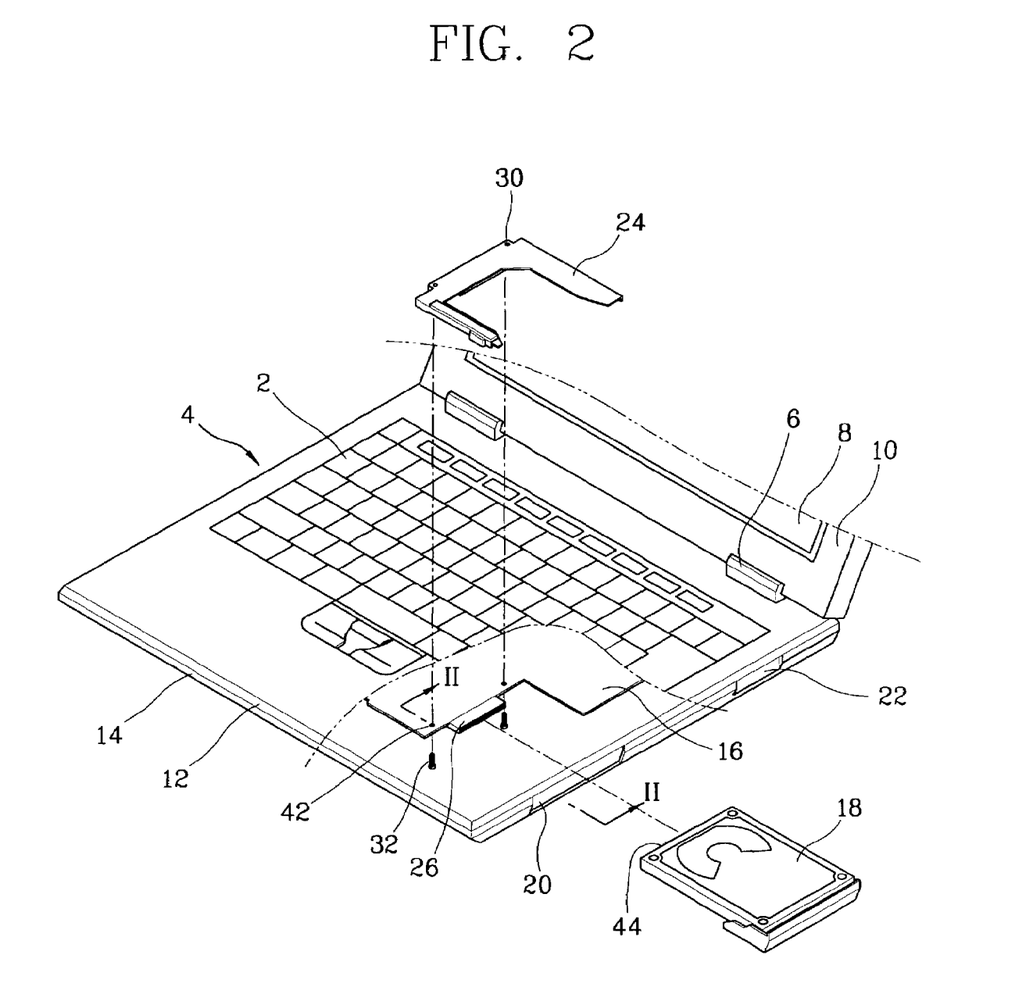
FIG. 2 is a diagram that shows a partial cut-away perspective view of a preferred embodiment of a peripheral device installation structure of a portable computer in accordance with the present invention.

FIG. 2 is a diagram that shows an exploded-perspective view illustrating a holder for receiving a storing device of a portable computer in accordance with a first preferred embodiment of the present invention. As shown in FIG. 2, a portable computer in accordance with the first preferred embodiment of the present invention includes a main body 4 containing a key board 2 for inputting various information and a cover 10. The cover 10 is preferably coupled to the main body 4 to rotate between an open and a closed position. The cover 10 includes a display device such as an LCD 8 and is rotatably supported on the main body 4 by hinges 6. The LCD 8 displays various information for a user.

In the main body 4, a deck casing 12 mounting the key board 2 is coupled to a lower casing 14 having a main board 16 installed thereon for mounting various circuit parts. The deck casing 12 and the lower casing 14 preferably form the shell of the main body 4. A bay 20 for inserting a storing device 18 and an expanded slot 22 for inserting a communication card such as a LAN card are formed at a side surface of the main body 4.

A holder 24 for receiving the storing device 18 inserted through the bay 20 is coupled to a selected side of the main board 16, and a connector 26 for electrical connection to the storing device 18 is coupled to the main board 16. As shown in FIG. 2, the holder 24 and the connector 26 are coupled to opposite sides of the main board 16.

Figure 3:
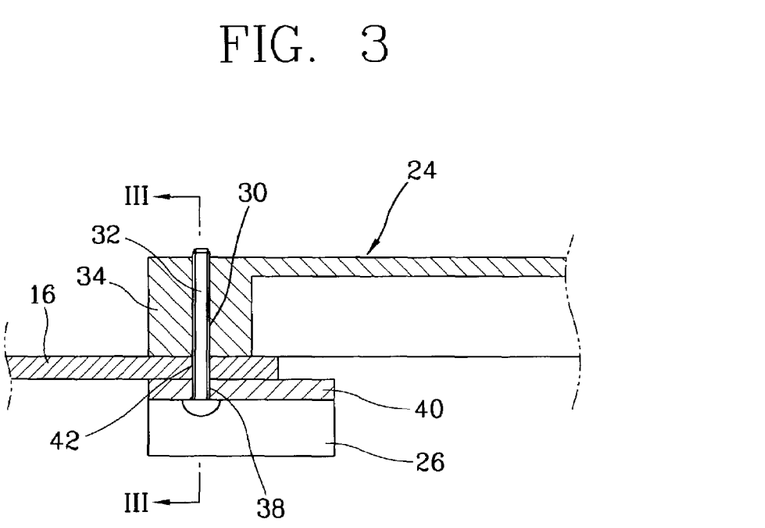
FIG. 3 is a is a diagram that shows longitudinal-sectional view taken along the line II—II in FIG. 2 illustrating a holder installation state in accordance with a preferred embodiment of the present invention.
Figure 4:
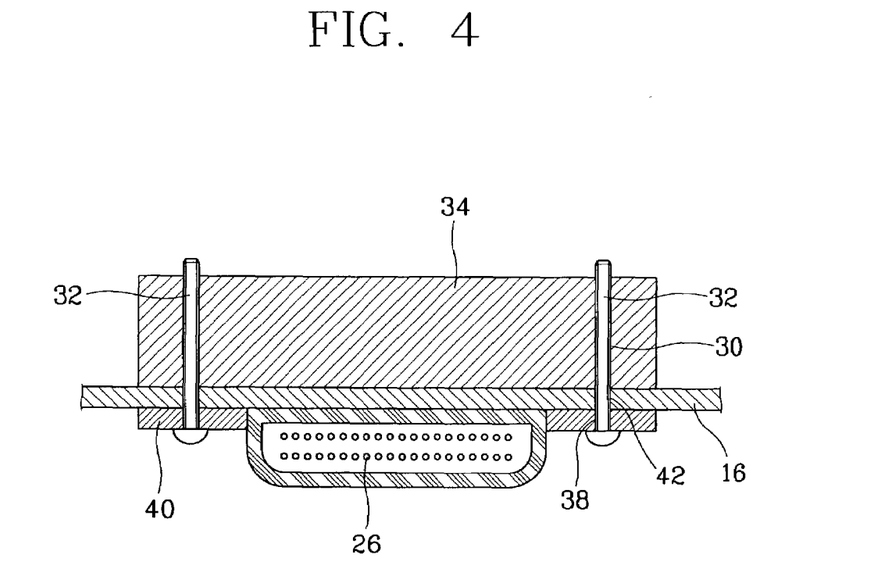
FIG. 4 is a diagram that shows a cross-sectional view taken along the line III—III in FIG. 3.

FIG. 3 shows a longitudinal-sectional view along line II—II of FIG. 2, and FIG. 4 shows a cross-sectional view along line III—III of FIG. 3. As shown in FIGS. 2–4, the connector 26 is coupled to a bottom surface of the main board 16.

Figure 5:
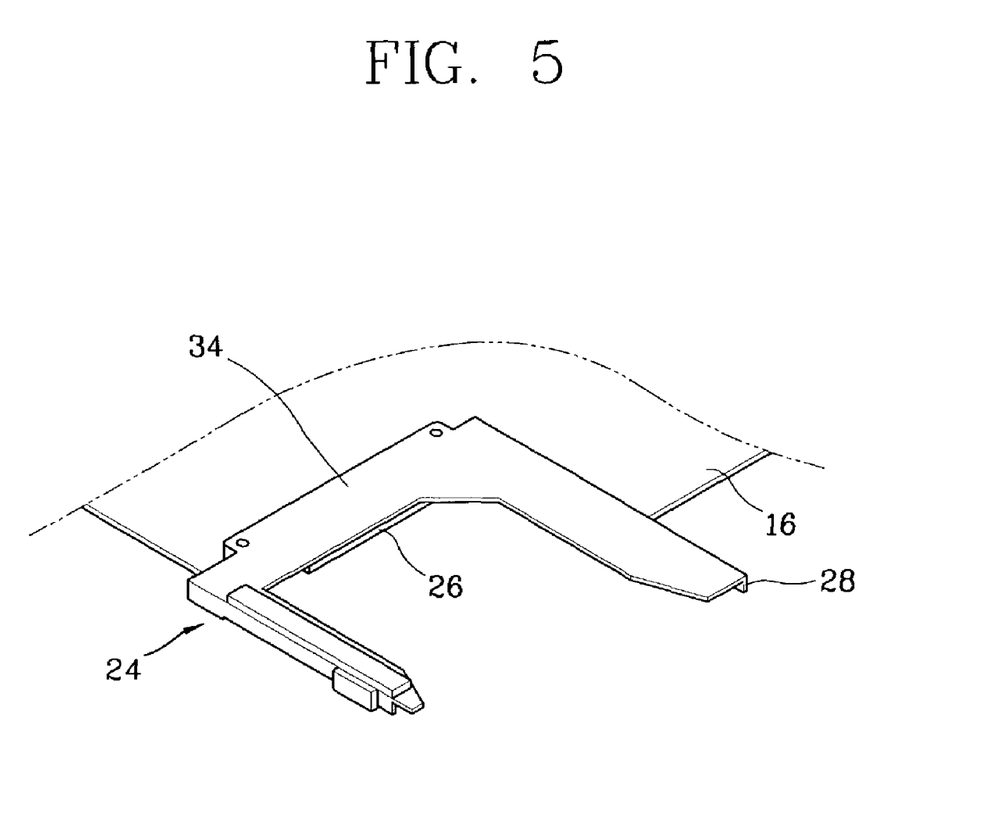
FIG. 5 is a diagram that shows a partial perspective view illustrating a holder fixed to the portable computer in accordance with a preferred embodiment of the present invention.

As shown in FIG. 5, the holder 24 has an open front surface with a pair of extending arms in order to receive the storing device 18, and an installation portion for fixing the holder 24 to the main board 16 is formed at the rear of the holder 24. In more detail, both edge portions 28 of the holder 24 having a certain width are downwardly curved to secure a receiving space of the storing device 18. Edge portions of the holder 24 are preferably supported by the bottom surface of the lower casing 14.

An installation portion 34 is preferably placed onto the upper surface of the main board 16 by being fixedly attached thereto. As shown in FIG. 5, and a bolt hole 30 is vertically formed at both sides of the installation portion 34.

The connector 26 is preferably placed at the bottom surface of the main board 16 by being fixedly attached thereto and electrically connected to the bottom surface of the main board 16. The connector 26 can be contacted to a connector 44 of the storing device 18 when the storing device 18 is installed in the portable computer. As shown in FIG. 2, the connector 44 is preferably an engaging portion of the storing device 18 having extended pins for slideable connection with receiving holes of the connector 26.

Preferably, a "U-shaped" fastening bracket 40 having a bolt hole 38 for connecting the connector 26 to the main board 16 with a bolt 32 is installed at the side surfaces of the connector 26. The bolt hole 30 formed at the installation portion 34 of the holder 24, the bolt hole 38 formed at the fastening bracket 40 of the connector 26 and a through hole 42 formed at the main board 16 are preferably aligned or placed in the same straight line for passing the bolt 32.

As shown in FIG. 2, it is preferable to use a hard disk drive as the storing device 18. However, it is also possible to use an optical disk, a floppy disk drive, a battery and a CD drive or the like as the storing device 18. In addition, various peripheral devices installed to a portable computer can be applied as the storing device 18.

A preferred embodiment of an assembly method of the holder 24 and the connector 26 will now be described. The installation portion 34 of the holder 24 is placed at the upper portion of the main board 16, and the connector 26 is placed at the bottom surface of the main board 16. In that state, the bolt 32 is inserted into the bolt hole 38 formed at the fastening bracket 40 that holds the connector 26, passes the through hole 42 formed at the main board 16 and is fastened to or at the bolt hole 30 formed at the installation portion 34 of the holder 24.

To replace the storing device 18 with a new one in use of the portable computer, a user pulls the storing device 18 to remove the storing device 18 from the holder 24 and through the bay 20 formed at the main body 4. Thus, the connector 44 installed at the storing device 18 is separated from the connector 26 installed at the main board 16, and accordingly the storing device 18 is detached.

When the user inserts a new storing device 18 into the holder 24 through the bay 20, the connector 44 of the new storing device 18 contacts the connector 26 of the main board 16. Accordingly, the new storing device 18 is attached.

In the first preferred embodiment of the peripheral device holder for a portable computer, both the connector 26 and the holder 24 are affixed to the main board 16 in a prescribed spatial arrangement. Preferably, the connector 26 and the holder 24 are affixed using identical connection points at the main board 16. Thus, the connector installation direction and position coincides with the holder installation direction and position. Further, positioning of the connector 44 of the storing device 18 and the connector 26 of the main board 16 are combined.

Figure 6:
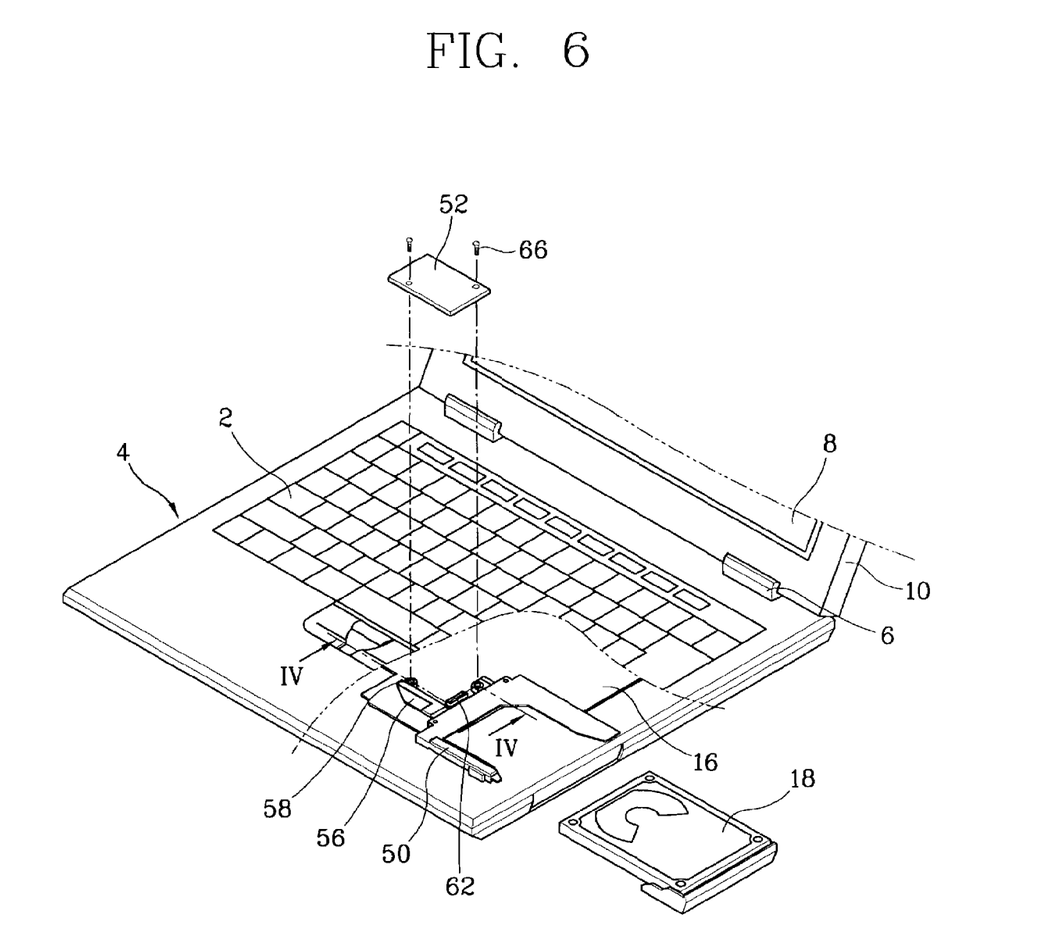
FIG. 6 is a diagram that shows an exploded partial cut-away perspective view illustrating an extended card mounting structure of a portable computer in accordance with another preferred embodiment of the present invention.

FIG. 6 is a diagram that shows an exploded perspective view of a second preferred embodiment of a peripheral device holder that also has an extended card mounting structure in a portable computer in accordance with the present invention. As shown in FIG. 6, the portable computer in accordance with the second preferred embodiment of the present invention includes a main body 4 and a cover 10 similar to the first preferred embodiment so a detailed description is omitted here. However, a holder 50 is installed at the main body 4 to receive a storing device 18, and a fixed portion 54 that is formed in the holder 50 installs an extended card 52.

As shown in FIG. 6, the holder 50 preferably has similar structure to the holder 24 in accordance with the first preferred embodiment. The holder 50 is directly connected to the upper surface of the main board 16 and combined with the connector 26 by a bolt 32. However, a fixed portion 54 is formed at the opposite side surface of the holder 50 from which the storing device 18 is inserted and preferably aligns and installs the extended card 52 to the main board 16.

In the fixed portion 54, a fixed board 56 having a prescribed size and area is formed extending as one body in a substantially perpendicular direction away from a bottom side surface of the fixed portion 54 that separates and position guide arms. A fixed hole 58 is preferably formed in the fixed board 56 in order to attach by screw-fastening or the like the extended card 52. A connector 62 to contact and electrically connect to the installed extended card 52 that is attached to the fixed board 56, is electrically contacted to the upper surface of the main board 16.

Figure 7:
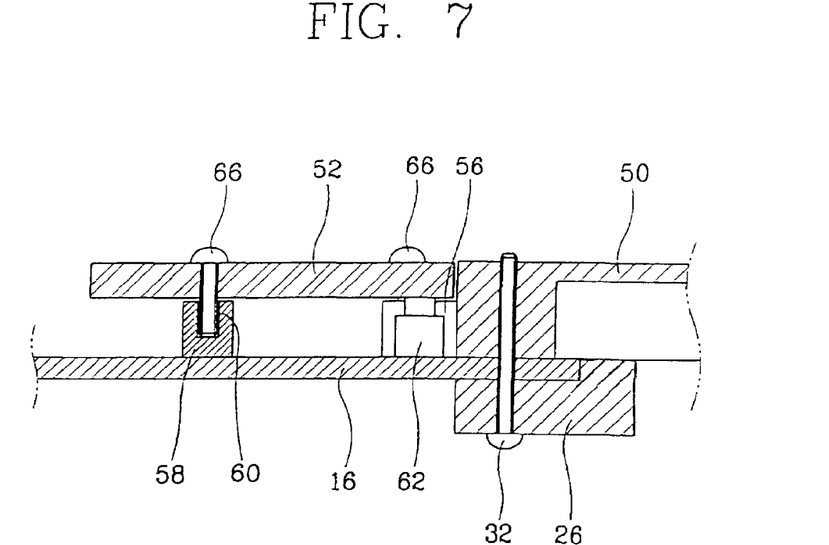
FIG. 7 is a diagram that shows a sectional view taken along the line of IV—IV in FIG. 6.
Figure 8:
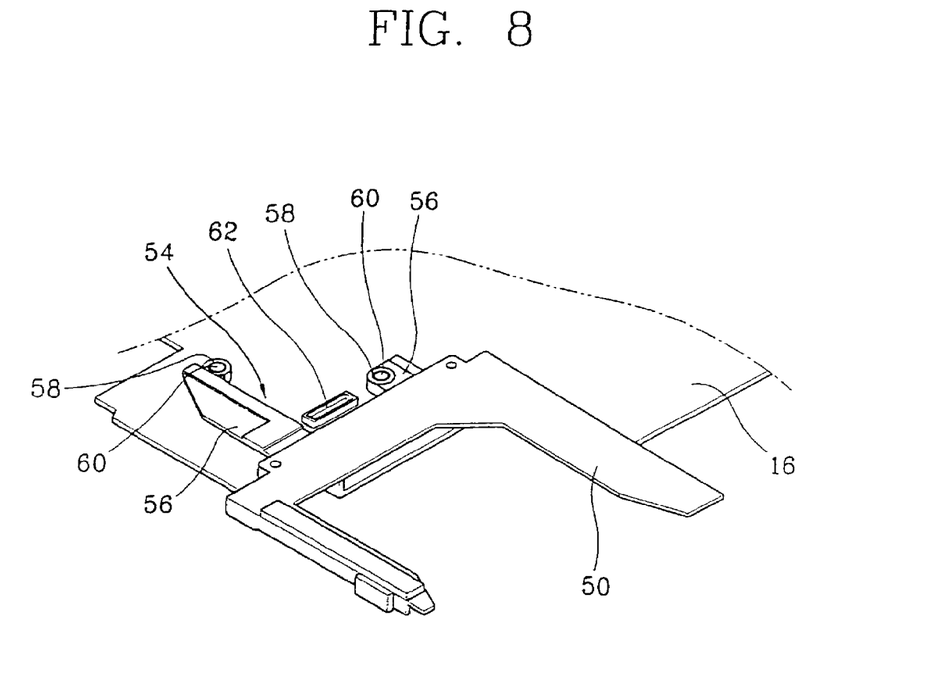
FIG. 8 is a diagram that shows a partial perspective view of a holder fixed to the portable computer in accordance with another preferred embodiment of the present invention.

As shown in FIGS. 6–8, the fixed board 56 can additionally be divided into two parts extending away from separated portions of the fixed portion 54 of the holder 50. In this case, a fixed hole 58 can be respectively formed at the both ends of the fixed board 56, and the connector 62 is preferably placed between the divided fixed boards 56.

The fixed hole 58 is preferably made of a metal material and has a screw hole 60 fastened to the extended card 52 by a screw 66. The fixed hole 58 is permanently affixed to the fixed board 56 by an insert molding.

It is preferable to use a communication card as the extended card 52. A modem, a LAN, a wireless LAN and a bluetooth module, etc. can be used as the communication card.

FIG. 7 is a diagram that shows a front side view of a cross-section taken along the line of IV—IV in FIG. 6. As shown in FIG. 7, the connector 26 can be formed to extend and be flush with the top surface of the main board 16. Alternatively, the connector 26 can be formed so that the connector 44 of the storing device 44 are even with or a prescribed distance below the top surface of the main board 16.

A preferred embodiment of an extended card assembling process of a portable computer in accordance with the present invention will be described. The extended card assembling process can be used, for example, with the second preferred embodiment of a peripheral device holder of a portable computer.

After installing the holder 50 at the main board 16, the extended card 52 is aligned by the holder 50 and placed at the upper surface of the fixed board 56 and contacted to the connector 62. Then, the assembly of the extended card 52 if complete. In addition or optionally, the screw 66 is inserted into the screw hole 60 formed at the one, two or optionally more fixed holes 58 to complete the assembly of the extended card 52. Further, the storing device 18 can be installed in an opposite side of the holder 50.

Figure 9:
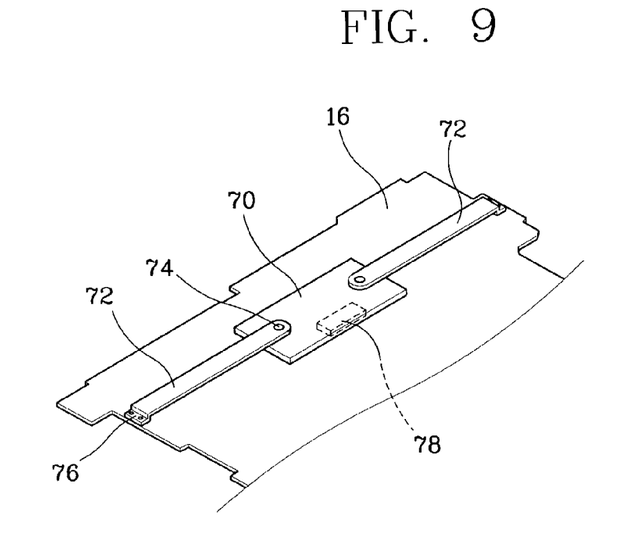
FIG. 9 is a diagram that shows a partial perspective view of an extended card mounting structure of a portable computer in accordance with yet another preferred embodiment of the present invention.

FIG. 9 is a diagram that shows a partial perspective view of an extended card mounting structure of a portable computer in accordance with a third preferred embodiment of the present invention. As shown in FIG. 9, in a portable computer in accordance with the third preferred embodiment of the present invention, a fixed board 72 for fixing an extended card 70 is installed at the upper portion of the main board 16 preferably extending with a prescribed separation distance from the main board 16.

In the fixed board 72, which is preferably shaped as a flat plate having a certain thickness, one end is fixed to the edge portion of the main board 16, and a screw hole 74 or the like for fastening such as by screw-combining the extended card 70 is formed at the other end. Thus, the fixed board 72 is preferably horizontally placed at the upper surface of the main board 16. A connector 78, which is contacted to the extended card 70 fixed to the fixed board 72, is electrically connected to the main board 16.

As shown in FIG. 9, there are a couple of fixed boards 72. In this case, one end of each fixed board 72 is respectively fixed to the edge portion of the main board 16. In more detail, the one end of each fixed board 72 is curved to maintain the separation distance over the main board 16 and combined with the main board 16 by a bolt 76. It is possible to install plural fixed boards 72 in the third preferred embodiment at the upper surface of the main board 16, and it is preferable to fix one extended card 70 with two fixed boards 72.

In the portable computer in accordance with the third preferred embodiment of the present invention, plural fixed boards 72 for each of a plurality of extended cards 70 installed at the upper surface of the main board 16 can be fixed to the edge portion of the main board 16. In this case, each of the extended cards 70 is placed onto the two screw holes 74 respectively formed at portions of each fixed board 72. The extended card 70 is contacted to the connector 78 and is combined with the fixed boards 72 by screws fastened to the screw holes 74 to complete an assembly of the extended card 70.

Figure 10:
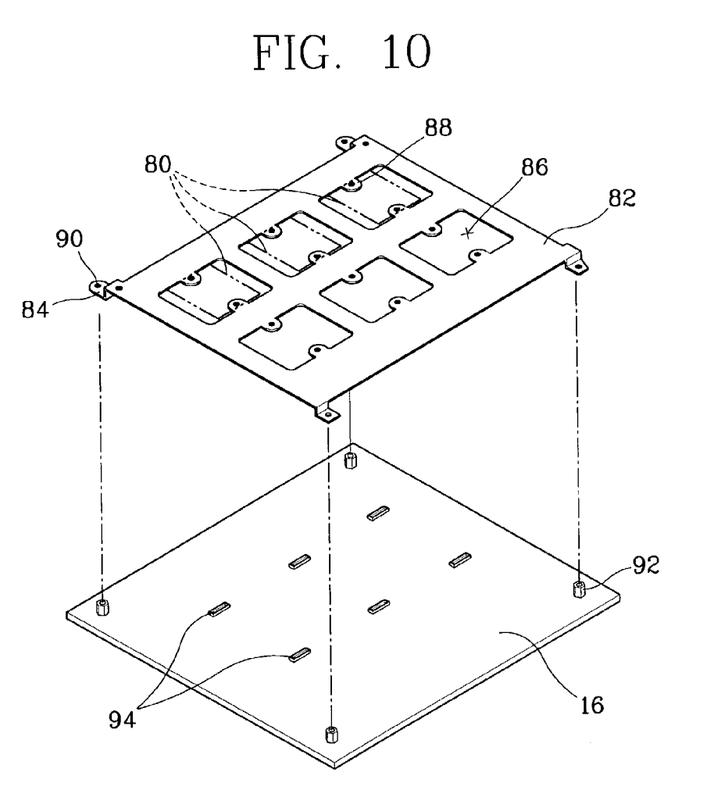
FIG. 10 is a diagram that shows a partial perspective view of an extended card mounting structure of a portable computer in accordance with still another preferred embodiment of the present invention.

FIG. 10 is a diagram that shows partial perspective view of an extended card mounting structure of a portable computer in accordance with a fourth preferred embodiment of the present invention. As shown in FIG. 10 in a portable computer in accordance with the fourth preferred embodiment, a fixed plate 82 at which plural extended cards 80 are fixed with a prescribed distance and set spatial arrangement relative to the main board 16, is placed at the upper portion or upper surface of the main board 16.

In the fixed plate 82 shaped as a flat plate having set dimensions, an installation portion 84 installed with a certain distance from the main board 16 is formed at the side surface. The fixed plate 82 further includes plural space parts 86 at which extended cards 80 are respectively attached and each screw hole portion 88 is internally projected from the side surface of the space parts 86 in order to attach such as by screw-combining the extended card 80. Plural connectors 94 that are respectively contacted to the installed extended cards 80 affixed to the fixed plate 82 are electrically connected at the upper surface of the main board 16.

In order to fix the fixed plate 82 with a prescribed distance above the main board 16, the installation portion 84 is downwardly curved so as to have a certain width extending from corners of the fixed plate 82, and each corresponding bolt hole 90 is formed in the installation portion 84. A bolt hole portion 92, at which the installation portion 84 is bolt-combined, is upwardly projected from four corners of the main board 16 so as to have a prescribed height. However, the present invention is not intended to be so limited.

In the portable computer in accordance with the fourth preferred embodiment of the present invention, the fixed plate 82 is placed onto the upper surface of the main board 16 and is combined by a bolt, and accordingly the fixed plate 82 is fixed to the upper surface of the main board 16 with a predetermined spatial arrangement. At that state, when extended cards 80 are respectively placed by screw hole portions 88 at each space part 86 formed at the fixed plate 82, each extended card 80 contacts a corresponding connector 94. Then, a screw is fastened to the screw hole portion 92, and an assembly of the extended card 80 is completed.

It is preferable to use a communication card as extended card 70, 80 in accordance with the third and fourth preferred embodiments. A modem, a LAN, a wireless LAN and a bluetooth module, etc. can be used as the communication card.

As described above, preferred embodiments of a portable computer in accordance with the present invention have various advantages. In a preferred embodiment of a portable computer in accordance with the present invention, by placing a holder for receiving a storing device or extended device and a connector for connection to the storing device fixed to the main board, positions of the holder and the connector can be accurately arranged, and accordingly the connector installed to the storing device or extended device can be accurately combined with the connector installed to the main board. In addition, by forming and/or electrically connecting the connector and holder on opposite sides of the main board, space useability of a main body of the portable computer is increased. By further forming a fixed portion, at which an extended card is combined, at a second side of a holder that has a first side that receives a storing device, an additional process for fixing the extended card to the main board is unnecessary. Thus, an alignment problem is reduced and is possible to facilitate an assembly process can be simplified. Moreover, because a space for fixing the extended card to the main board is unnecessary, a space requirement of the main board are reduced and space useability of the main board can be improved.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A portable computer, comprising:
a main circuit board for connection to a plurality of components, the main circuit board comprising,
a first connector mounted on a second surface of the main circuit board opposite a first surface of the main circuit board for connection to a first storage device, and
a second connector mounted on the first surface of the main circuit board for connection to an extension card; and
a holder directly attached to the main circuit board, wherein the holder aligns an engaging portion of the first storage device to the first connector and an engaging portion of the extension card to the second connector, wherein the holder has a guide portion to guide a detaching/attaching operation of the first storage device, wherein the holder is mounted only on the first surface of the main circuit board, wherein a first side of the holder has the guide portion, and wherein a second side of the holder different from the first side of the holder has a fixed portion for guiding the extension card, wherein the fixed portion on the second side does not vertically overlap the guide portion on the first side of the holder.

2. The portable computer of claim 1, wherein the holder comprises:
a first pair of parallel arms for receiving the first storage device therebetween; and
a second pair of arms for receiving the extension card therebetween, the second pair of arms extending substantially perpendicular from a common connection point, wherein one of the second pair of arms extends between the first pair of arms to determine a parallel relationship of the parallel arms.

3. The portable computer of claim 1, wherein the first side of the holder has the guide portion on each of a pair of arms to guide a detaching/attaching operation of the storage device, and wherein the holder has an installation portion connecting said arms, wherein the installation portion is mounted on the first surface of the main circuit board.

4. The portable computer of claim 1, wherein the fixed portion includes a fixed board extending with a first side for aligning the extension card and a side of the installation portion aligns the extension card therebetween.

5. The portable computer of claim 4, wherein the second connector is installed on an upper surface of the main circuit board.

6. The portable computer of claim 4, wherein a fixed hole made of a metal material and including a fastening element is molded in the fixed board.

7. The portable computer of claim 3, wherein the first connector is electrically connected to a bottom surface of the main circuit board, and a fastening bracket fixing the first connector to the main circuit board is attached to the main board.

8. The portable computer of claim 3, wherein a first through hole for passing a fastener is formed at the main circuit board in alignment with a second through hole of an installation portion of the holder and a third through hole of a fastening bracket that holds the first connector.

9. The portable computer of claim 8, wherein the fastener is a bolt using the first to third through holes to align and affix the holder and the first connector.

10. The portable computer of claim 7, wherein a portion of the first connector electrically coupling to the storage device is formed having a top surface substantially aligned with an upper surface of the main circuit board.

11. The portable computer of claim 3, wherein the second side of the holder is opposite the first side and includes the fixed portion that aligns the extension card, and wherein the opposite sides are upper and lower sides of the main circuit board.

12. The portable computer of claim 1, wherein the first storage device is one of a hard disk drive, a floppy disk drive, a battery and a CD drive, wherein the extension card is a communication card, wherein the communication card is one of a modem, a LAN, a wireless LAN and a bluetooth module.

13. The portable computer of claim 1, wherein a portion of the first connector electrically coupling to the first storage device is formed having a top surface substantially in a plane determined by the first surface of the main circuit board.

14. A portable computer, comprising:
a main body;
a display unit that outputs various information, wherein the display unit is rotatably coupled to the main body to move between an open and closed position;
a main board in the main body that mounts various circuit parts for processing information and applying electric signals to the display unit;
an input unit that inputs control signals to the main board according to a user's order;
a holder mounted to the main board, wherein the holder comprises,
a first holding surface on one side of the holder, and
a second holding surface on a different side of the holder;
a first peripheral device including a storing device held on said first holding surface; and
a second peripheral device including an extension card held on said second holding surface, wherein the first peripheral device is electrically connected to a first connector mounted on a lower surface of the main board, and wherein the second peripheral device is electrically connected to a second connector mounted on an upper surface of the main board, wherein a first side of the holder has a guide portion on each of a pair of arms to guide a detaching/attaching operation of the storage device, and wherein the holder has an installation portion connecting said arms to be fixed to the main circuit board, wherein a portion of the first connector electrically coupling to the storage device is formed having a top surface substantially in a plane determined by the upper surface of the main circuit board.

15. The portable computer of claim 14, wherein the fixed portion includes a fixed board extending with a first side for aligning the extension card and a side of the installation portion aligns the extension card therebetween.

16. The portable computer of claim 15, wherein a first through hole for passing a fastener is formed at the main circuit board in alignment with a second through hole of the installation portion and a third through hole of the first connector.

17. The portable computer of claim 14, wherein the first storage device is one of a hard disk drive, a floppy disk drive, a battery and a CD drive, wherein the extension card is a communication card, and wherein the communication card is one of a modem, a LAN, a wireless LAN and a bluetooth module.

18. An electronic apparatus, comprising:
an apparatus body having a wall portion in which a card insertion hole is formed;
a main circuit board for connection to a plurality of components, the main circuit board including a first connector mounted on a first surface of the main circuit board; and
a holder directly mounted on a second surface of the main circuit board having an opening portion opposed to the card insertion hole of the apparatus body, and defining a card storage portion for storing a card-like electronic component to be inserted from the card insertion hole, wherein the first connector is for connection to the card-like electronic component loaded into the card storage portion, and wherein the second surface is opposite the first surface of the main circuit board, wherein the holder has a guide portion to guide a detaching/attaching operation of the card-like electronic component, and wherein the holder has an installation portion fixed to the second surface of the main circuit board, wherein a portion of the first connector electrically coupling to the card-like electronic component is formed having a top surface substantially in a plane determined by the second surface of the main circuit board.

19. The electronic apparatus of claim 18, wherein the first connector is mounted on a bottom surface of the main circuit board.

20. The electronic apparatus of claim 18, wherein the electronic apparatus is a portable computer including a main body rotatably supporting a cover housing a display, wherein the main body includes the wall portion.

21. The electronic apparatus of claim 18, wherein a first side of the holder has the guide portion on each of a pair of arms to guide a detaching/attaching operation of the card like electronic component, wherein a second side of the holder has a fixed portion for holding an extension card in electrical connection with a second connector mounted on the second surface of the main circuit board, wherein the fixed portion on the second side does not overlap the guide portion on the first side of the holder.

22. The electronic apparatus of claim 18, wherein a first side of the holder has the guide portion on each of a pair of arms to guide a detaching/attaching operation of the card-like electronic component, and wherein the holder has the installation portion connecting said arms, wherein a first through hole for passing a fastener is formed at the main circuit board in alignment with a second through hole of the installation portion and a third through hole of the first connector.

* * * * *